US008631166B2

(12) United States Patent
Lee

(10) Patent No.: US 8,631,166 B2
(45) Date of Patent: Jan. 14, 2014

(54) STORAGE DEVICES WITH BI-DIRECTIONAL COMMUNICATION TECHNIQUES AND METHOD OF FORMING BI-DIRECTIONAL COMMUNICATION LAYER BETWEEN THEM

(75) Inventor: Jaesoo Lee, Hwaseong-si (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 251 days.

(21) Appl. No.: 13/178,131

(22) Filed: Jul. 7, 2011

(65) Prior Publication Data

US 2012/0036287 A1 Feb. 9, 2012

(30) Foreign Application Priority Data

Aug. 3, 2010 (KR) .................. 10-2010-0075062

(51) Int. Cl.
*G06F 3/00* (2006.01)
*G06F 13/12* (2006.01)
*G06F 15/177* (2006.01)
*G06F 15/16* (2006.01)

(52) U.S. Cl.
USPC ................... 710/8; 710/10; 710/62; 709/222; 709/228

(58) Field of Classification Search
None
See application file for complete search history.

(56) References Cited

U.S. PATENT DOCUMENTS

2010/0312864 A1* 12/2010 Butt et al. ............... 709/220
2011/0087790 A1* 4/2011 Mosek .................... 709/228

FOREIGN PATENT DOCUMENTS

| JP | 06-102968 | 4/1994 |
| JP | 2001-147885 | 5/2001 |
| KR | 1020000016245 A | 3/2000 |
| KR | 1020080031150 A | 4/2008 |

OTHER PUBLICATIONS

Serial ATA II Native Command Queuing Overview, Apr. 2003, Intel, pp. 1-21.*
T13 Technical Editor, "AT Attachment with Packet Interface—7, vol. 1—Register Delivered Command Set, Logical Register Set (ATA/ATAPI-7 V1)", ANSI INCITS, Apr. 2004.
"Serial ATA Revision 2.6 specification (final)," Serial ATA International Organization, Feb. 2007.
"Serial ATA Revision 3.0-Gold Revision," Serial ATA International Organization, May 2009.
T10 Technical Editor, "SCSI Primary Commands—3 (SPC-3) Rev. 23,"ISO/IEC 14776-313, ANSI INCITS, May 2005.
T10 Technical Editor, "SCSI Object-Based Storage Device Commands-2 (OSD-2),"ISO/IEC 14776-392, ANSI INCITS, Jan. 2009.
A. Raghuveer, S.W. Schlosser, and S. Iren, "Enabling database-aware storage with OSD, "Proceedings of the 24th IEEE Conference on Mass Storage Systems and Technologies, 2007, p. 129-142.

* cited by examiner

*Primary Examiner* — Idriss N Alrobaye
*Assistant Examiner* — David Martinez
(74) *Attorney, Agent, or Firm* — F. Chua & Associates, LLC

(57) ABSTRACT

A storage device includes a storage media storing an information structure for establishing a bidirectional communication layer and a controller configured to send the information structure to an external device according to an information structure read/write command. A layer for a bidirectional communication between the storage device and the external device is formed according to the information structure.

17 Claims, 9 Drawing Sheets

STORAGE DEVICES WITH BI-DIRECTIONAL COMMUNICATION TECHNIQUES AND METHOD OF FORMING BI-DIRECTIONAL COMMUNICATION LAYER BETWEEN THEM

CROSS-REFERENCE TO RELATED APPLICATIONS

This application claims priority under 35 U.S.C §119, to Korean Patent Application No. 10-2010-0075062 filed Aug. 3, 2010, the disclosure of which is incorporated by reference in its entirety herein.

BACKGROUND

1. Technical Field

Exemplary embodiments of the inventive concept relate to an electronic device, and more particularly, to a storage device and a system including the same.

2. Discussion of Related Art

Computer systems may use several types of memory systems. For example, a computer system may use main memory including semiconductor memory devices that can be randomly written to and read from (e.g., random access memories). However, since semiconductor memories are relatively expensive, other higher density and lower cost memories may be used to reduce cost. For example, a magnetic disk storage system may be used instead of a semiconductor memory device. While an access time for a magnetic disk storage system is in the order of tens of milliseconds, the access time for a main memory is in the order of hundreds of nanoseconds. Another type of disk like storage is solid state disk storage SSD (also called a solid state drive). SSD is a data storage device that uses memory chips, such as synchronous dynamic random access memory SDRAM to store data, instead of spinning platters found in hard disk drives.

A first type of SSD, which is based on volatile memory, such as SDRAM may enable high speed data access. The first type of SSD may be used to accelerate an application whose performance is hindered by the latency of a disk drive. The first type of SSD may incorporate an internal battery and a backup disk to ensure data persistence. If power is lost, the battery keeps the unit powered long enough to copy data from RAM to the backup disk. Upon the restoration of power, data is copied back from backup disk to RAM and the SSD resumes normal operation. The first type of SSD may be useful on a computer, which already has a maximum amount of RAM. A second type of SSD uses flash memory to store data. The different types of SSD may be used as low power, rugged replacements for hard drives.

SUMMARY

An exemplary embodiment of the inventive concept includes a storage device having a storage media storing an information structure for establishing a bidirectional communication layer, and a controller configured to send the information structure to an external device according to an information structure read/write command. A layer for a bidirectional communication between the storage device and the external device is formed according to the information structure.

An exemplary embodiment of the inventive concept includes a method of forming a bidirectional communication layer between a storage device, including a storage media and a RAM, and an external device. The method includes loading an information structure for establishing the bidirectional communication layer in the storage media on the RAM when the storage device is electrically connected with the external device, and transferring the information structure to the external device in response to an information structure read/write command from the external device. A layer for a bidirectional communication with the external device is determined according to the information structure.

An exemplary embodiment of the inventive concept includes a method of bi-directionally transferring a message between a storage device, including a storage media and a RAM, and a host. The method includes forming a bidirectional communication layer between the host and the storage device by sending an information structure stored in the storage device to the host in response to an information structure read/write command from the host and sending or receiving a message to or from the host via the bidirectional communication layer.

An exemplary embodiment of the inventive concept includes a system having a host and a storage device storing an information structure needed to form a bidirectional communication layer. The host may be directly connected with the host. The storage device sends the information structure to the host in response to an information structure read/write command from the host. A layer for a bidirectional communication between the host and the storage device is defined according to the information structure.

According to an exemplary embodiment of the invention, a method of forming a bidirectional communication channel between a storage device and an external device includes sending a command from the external device to the storage device that is configured to access data of an information structure that includes data used to establish a bidirectional communication channel, transferring the information structure from the storage device to the external device in response to the command, and establishing, by the external device, the bidirectional communication channel using the transferred information structure.

BRIEF DESCRIPTION OF THE FIGURES

Embodiments of the invention concept will become more apparent from the following description with reference to the following figures, wherein like reference numerals refer to like parts throughout the various figures unless otherwise specified.

DETAILED DESCRIPTION

Figure 1:
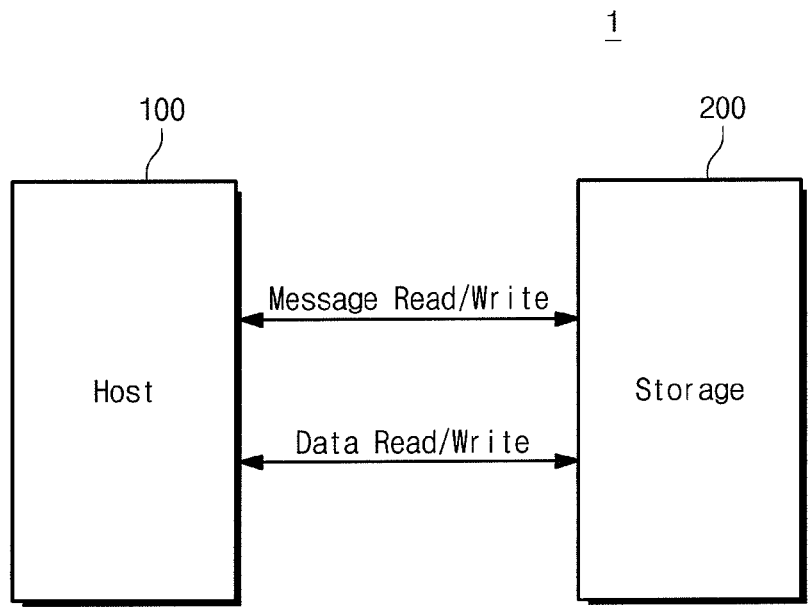
FIG. 1 is a block diagram showing a system including a storage device according to an exemplary embodiment of the inventive concept.

The inventive concept is described more fully hereinafter with reference to the accompanying drawings, in which exemplary embodiments of the inventive concept are shown. This inventive concept may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram showing a system including a storage device according to an exemplary embodiment of the inventive concept.

Referring to FIG. 1, a system 1 may include a host 100 and a storage device 200. The storage device 200 may be directly connected with the host 100. For example, the storage device 200 may be directly connected with the host 100 via a Parallel Advanced Technology Attachment PATA interface standard, a Serial Advanced Technology Attachment SATA interface standard, a Small Computer System Interface SCSI interface standard, a Serial Attached SCSI SAS interface standard, etc. In accordance with an exemplary embodiment of the inventive concept, the host 100 may store or read user data in or from the storage device 200 via one of the above described interface standards. For example, user data may be transferred between the host 100 and the storage device 200 via a unidirectional communication protocol. In addition, the storage device 200 according to an exemplary embodiment of the inventive concept may be configured to send and receive a message to and from the host 100 according to a bidirectional communication protocol. For example, the storage device 200 may be configured to receive a message from the host 100 and to send a message to the host 100. For example, a bidirectional communication protocol may be established between the host 100 and the storage device 200 for communication therebetween.

In accordance with an exemplary embodiment of the inventive concept, when an 'application agent' or an 'application proxy of an application on the host 100 is stored on the storage device 200, bidirectional communication (e.g., bidirectional message transfer) between the application and the application agent or proxy uses a bidirectional communication channel defined according to a bidirectional communication protocol. An application proxy may act as an intermediary between two processes, a client and a server, for example. An application agent may act for a user or another process, for example.

Figure 2:
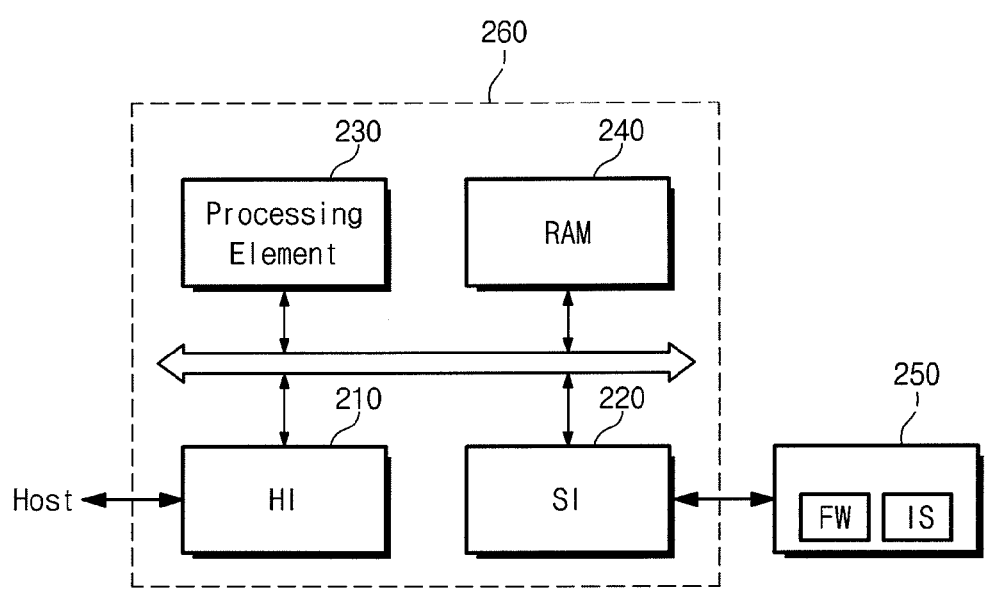
FIG. 2 is a block diagram showing a storage device illustrated in FIG. 1 according to an exemplary embodiment of the inventive concept.

FIG. 2 is a block diagram showing a storage device illustrated in FIG. 1 according to an exemplary embodiment of the inventive concept.

Referring to FIG. 2, a storage device 200 may be a Solid State Drive (SSD), which utilizes non-volatile memory devices, for example. However, the storage device 200 is not limited to being an SSD. For example, the storage device 200 may be a Hard Disk Drive (HDD). The storage device 200 may include a host interface 210, a storage interface 220, a processing element 230, a RAM 240, and a storage media 250. The elements 210 to 240 may be part of a controller 260 for controlling the storage media 250.

The host interface 210 may be configured to interface with a host according to a given interface standard (for example, a PATA/SATA/SCSI/SAS interface standard). The storage interface 220 may be configured to interface with the storage media 250. The processing element 230 may be configured to control the overall operation of the storage device 200. For example, the processing element 230 may control the overall operation of the storage device 200 by operating firmware loaded on the RAM 240. The RAM 240 may be used as a buffer, which stores data in the storage media 250 and reads data out from the storage media 250. The RAM 240 may be further used as a working memory of the processing element 230. The RAM 240 may be a DRAM, for example. The RAM 240 may be formed of a combination of a DRAM and an SRAM.

The storage media 250 operates under the control of the controller 260 and is used to store data. The storage media 250 may store user data and firmware FW, operated by the processing element 230, and a messaging information structure IS used for the bidirectional communication. The firmware FW and the messaging information structure IS may be loaded on the RAM 240 upon power-on. For example, the storage interface 220 may copy the FW and/or the structure IS from the storage media 250 to the RAM 240 upon power-on. A section of the storage media 250 in which user data, the firmware FW, and the messaging information structure IS are stored, may be referred to as a 'user space' or 'user data space'.

In an exemplary embodiment, the firmware FW may include a program for processing commands, a program for downloading and installing an application agent or and application proxy, a program for managing data (e.g., a program that supports normal file systems with flash memory within a flash translation layer FTL), etc. The messaging information structure IS may include parameters and setting values used for the bidirectional communication. The parameters and setting values used for the bidirectional communication may be sent to the host 100 via an identification process. The bidirectional communication channel (e.g., a layer) may be defined between the host 100 and the storage device 200 according to the parameters and setting values used for the bidirectional communication.

Figure 3:
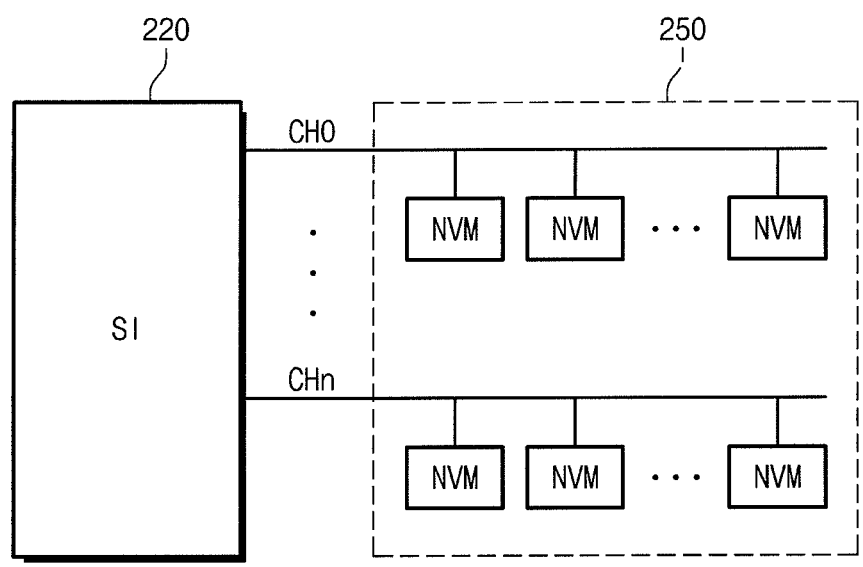
FIG. 3 is a block diagram showing a storage media illustrated in FIG. 2 according to an exemplary embodiment of the inventive concept.

FIG. 3 is a block diagram showing a storage media illustrated in FIG. 2 according to an exemplary embodiment of the inventive concept.

Referring to FIG. 3, a storage media 250 may be connected with a storage interface 220 of a controller 260 via multiple channels CH0 to CHn, each of which is connected with multiple non-volatile memories NVM. Each non-volatile memory NVM may be a flash memory, for example. However, the non-volatile memory NVM is not limited to being a flash memory. For example, the non-volatile memory NVM may be formed of a Phase Changing RAM PRAM, a ferroelectric RAM FeRAM, a magneto-resistive RAM MRAM, a combination of the PRAM, FeRAM, MRAM, and flash memory, etc.

Figure 4:
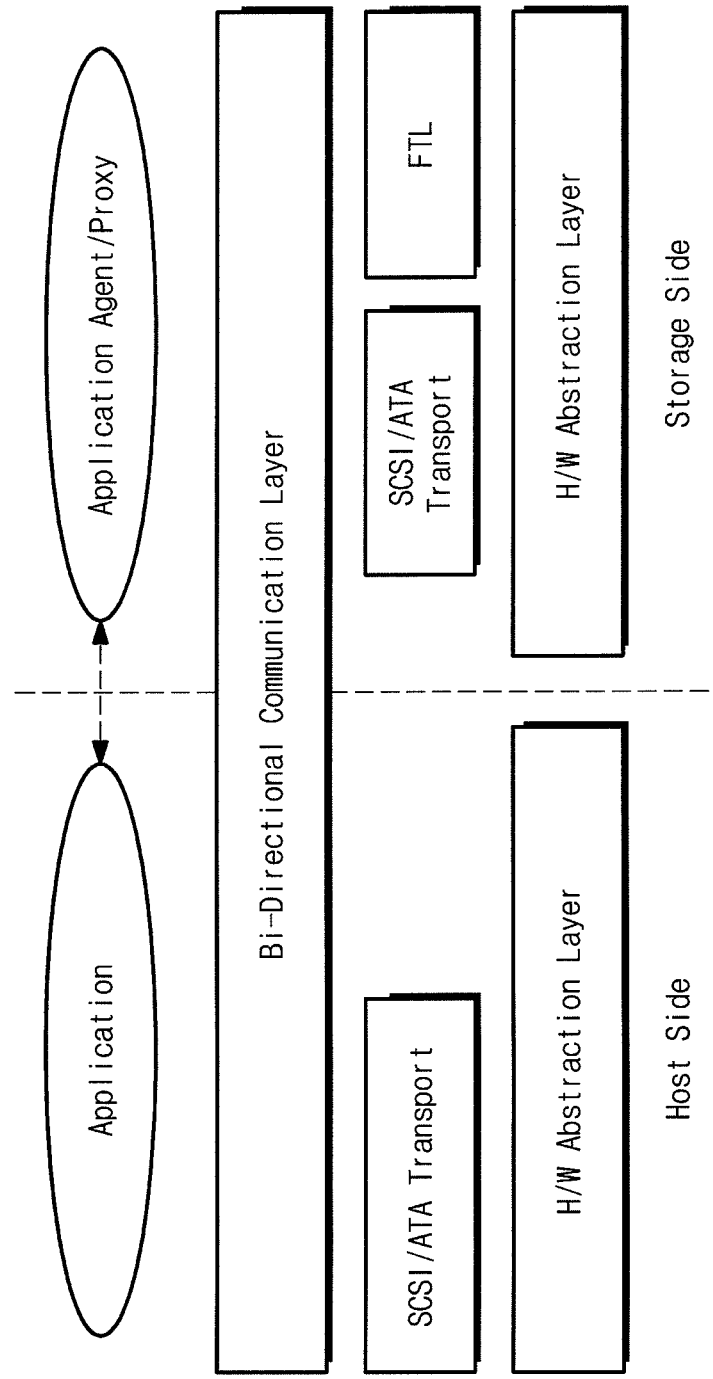
FIG. 4 is a diagram showing the hierarchical structure of a system according to an exemplary embodiment of the inventive concept.

FIG. 4 is a diagram showing the hierarchical structure of a system according to an exemplary embodiment of the inventive concept.

As illustrated in FIG. 4, the hierarchical structure of a system according to an exemplary embodiment of the inventive concept may further include a bidirectional communication layer, which is included in a link layer of the Open System Interconnection (OSI) 7 layer being a network communication model established by the International Organization for Standardization ISO. Messages may be transferred bidirectionally between an application and an application agent or an application proxy, based on the bidirectional communication layer using a communication protocol defined between a host 100 and a storage device 200. Although not shown in FIG. 4, a layer (for example, a Transmission Control Protocol/Internet Protocol TCP/IP) included in the OSI 7 layer may be further provided in the system for communication. Additional layers of the OSI model may be present depending upon the bidirectional communication layer. While FIG. 4 shows use of an SCSI or ATA transport layer, embodiments of the inventive concept are not limited thereto, as various other transport protocols may be used.

A bidirectional communication layer according to an exemplary embodiment of the inventive concept may be configured by sending a messaging information structure to the host 100 from a device (for example, the storage device 200). The messaging information structure may include a messaging feature set which indicates whether the storage device 200 is a device supporting a particular message function. Parameter values of the messaging information structure can be reconfigured after the bidirectional communication layer is configured. Configuring of the bidirectional communication channel/layer and reconfiguring of the messaging information structure IS may be performed through an identify mechanism. The bidirectional communication between the host 100 and the storage device 200 may be established according to a message transfer mechanism for sending messages using a bidirectional communication layer according to an exemplary embodiment of the inventive concept and a signaling mechanism used to transfer messages to a host from a device (for example, a storage device).

An exemplary embodiment of the identify mechanism is described below. The host 100 may read the messaging information structure IS stored in the storage device 200 to determine whether the storage device 200 is capable of performing bidirectional communication. This determination may be accomplished using a reserved command or a reserved logical block address LBA. The reserved command may be formed of two commands: a command for reading the messaging information structure IS and a vendor extension command for sending setting values. The reserved command may be a command for accessing the messaging information structure IS (e.g., one that reads from or stores data to the structure). For ease of discussion, the commands will be referred to as an 'information structure read/write command'. When the determination uses a reserved LBA, LBA values in the remaining LBA space, obtained by subtracting a user LBA space from an expressible LBA space, may be used as commands for reading the messaging information structure IS and setting parameter values. The LBA values may be referred to as an 'information structure read/write command'.

The host 100 may recognize the storage device 200 as a device capable of performing bidirectional communication by reading the messaging information structure IS for the bidirectional communication from the storage device 200 via the reserved command or LBA. Further, the host 100 can reconfigure setting values of the messaging information structure IS using the information structure read/write command. The information structure read/write command may be defined at the host 100. Definition of the information structure read/write command may be made via updating of a general device driver, for example. Alternatively, definition of the information structure read/write command may be made by installing a new device driver at the host 100.

An exemplary embodiment of the message transfer mechanism is discussed below. The bidirectional communication may include a mechanism for transferring a message to the storage device 200 from the host 100 and a message to the host 100 from the storage device 200. The message transfer mechanism may use a method of assigning buffers (e.g., buffers of a ring buffer) for storing a message being transferred. For example, in at least one embodiment, the mechanism uses a specific or reserved LBA mapped to each buffer. For example, in least one embodiment, the mechanism uses values stored in a Native Command Queuing NCQ or a Tagged Command Queuing TCQ structure that are mapped to each buffer.

When the reserved LBA manner is used, an inherent LBA value may be assigned to each buffer of a ring buffer. The inherent LBA values assigned to the buffers may be assigned from an LBA area, which is not used for user data. In an exemplary embodiment, the inherent LBA value of each buffer may be set between the maximum value of a user LBA and an expressible maximum LBA value and be assigned sequentially just prior to the maximum LBA value. The buffer number of a ring buffer, a size of each buffer, assigned LBA values, and head and tail pointers of the ring buffer may be recorded in the messaging information structure IS. When the NCQ manner is utilized, inherent NCQ tags may be assigned to buffers, respectively. Like the reserved LBA manner, the buffer number of a ring buffer, a size of each buffer, assigned tag values, and head and tail pointers of the ring buffer may be recorded in the messaging information structure IS.

An exemplary embodiment of the signaling mechanism is discussed below. A signaling mechanism using a notification or interrupt function may be used to send a message (for example, a message stored in a ring buffer) being prepared by the storage device 200 to the host 100. The notification function can notify the host 100 of a state change of the storage device 200 in an event manner. If notified, the host 100 may read a state of a device and detect whether an event is generated. A message may be sent to the host 100 from the storage device 200 using the NCQ manner instead of the signaling mechanism.

According to at least one embodiment of the inventive concept, the bidirectional communication layer may be formed between the host 100 and the storage device 200 via the identify mechanism, and a bidirectional message transfer between the host 100 and the storage device 200 may be made via the message transfer mechanism and the signaling mechanism based on the bidirectional communication layer.

Figure 5:
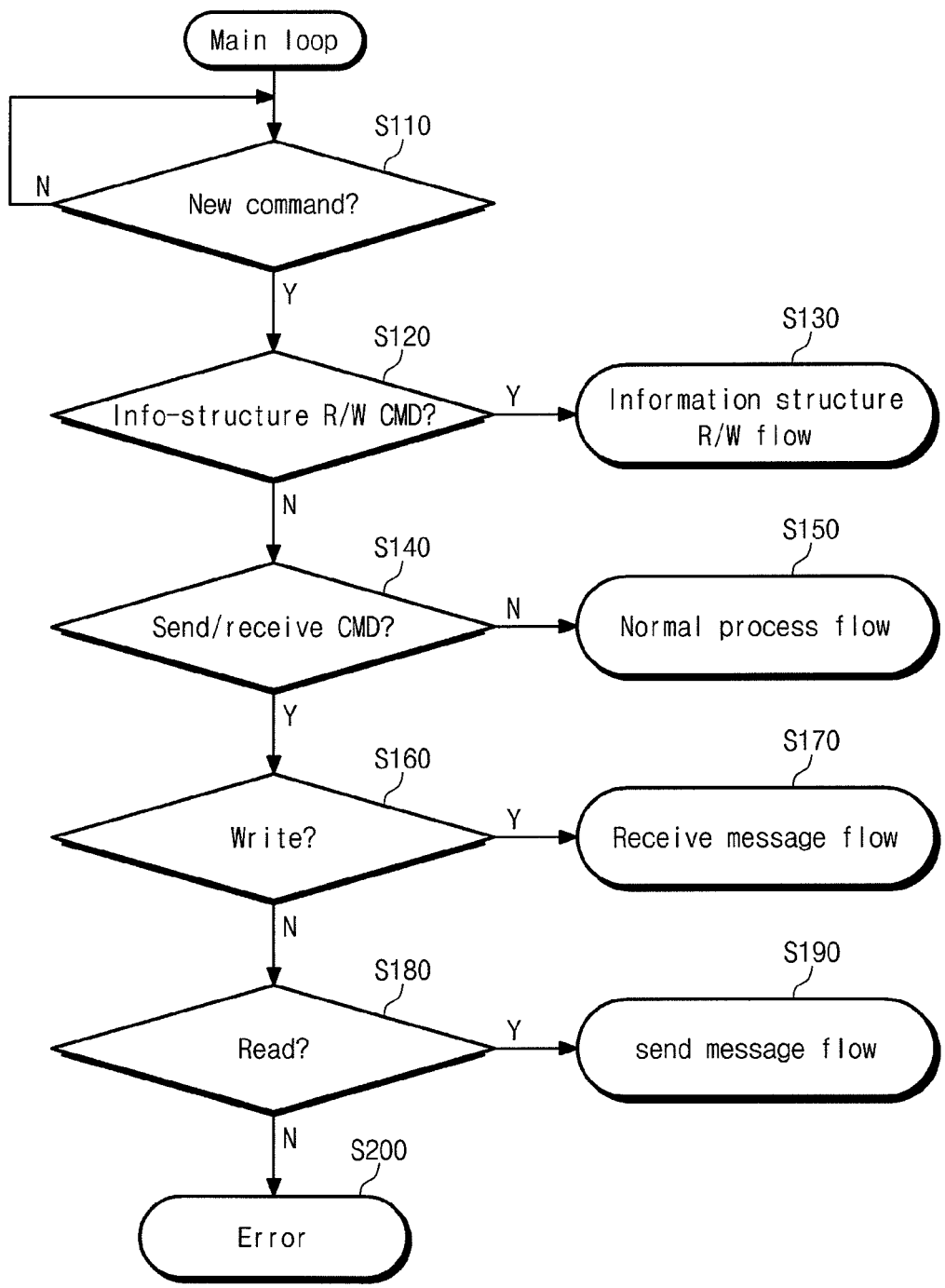
FIG. 5 is a flow chart for describing an identification operation and a bidirectional message sending operation of a system including a storage device according to an exemplary embodiment of the inventive concept.
Figure 6:
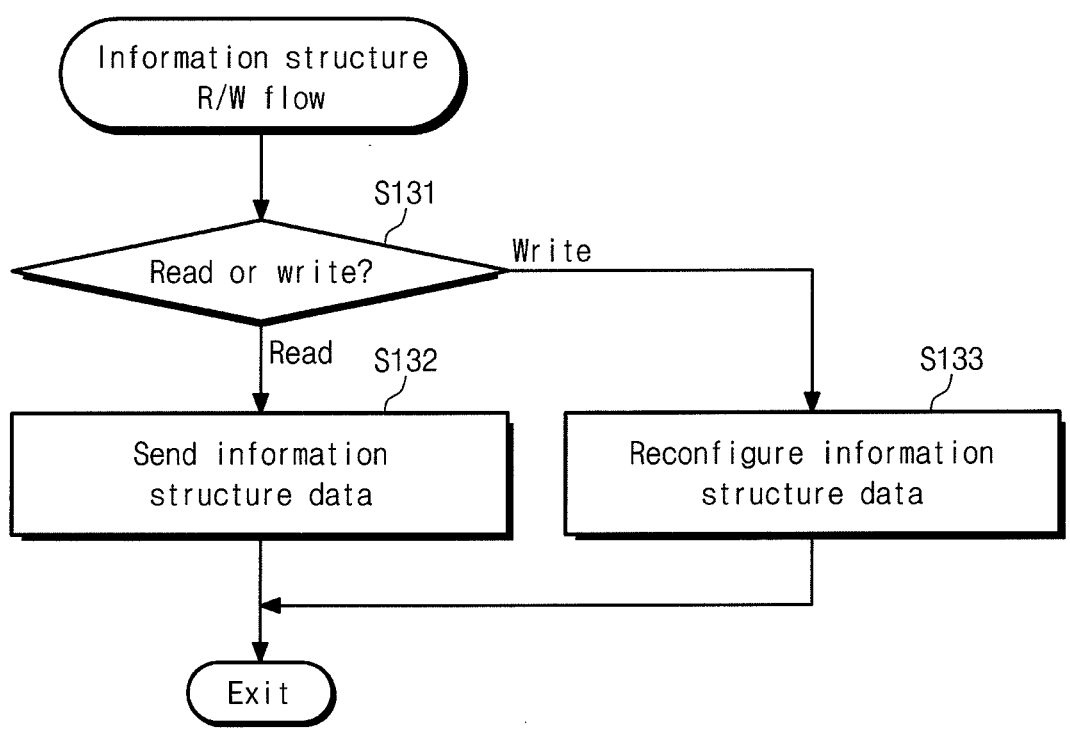
FIG. 6 is a flow chart for describing a message information structure reading/writing process illustrated in FIG. 5 according to an exemplary embodiment of the inventive concept.
Figure 7:
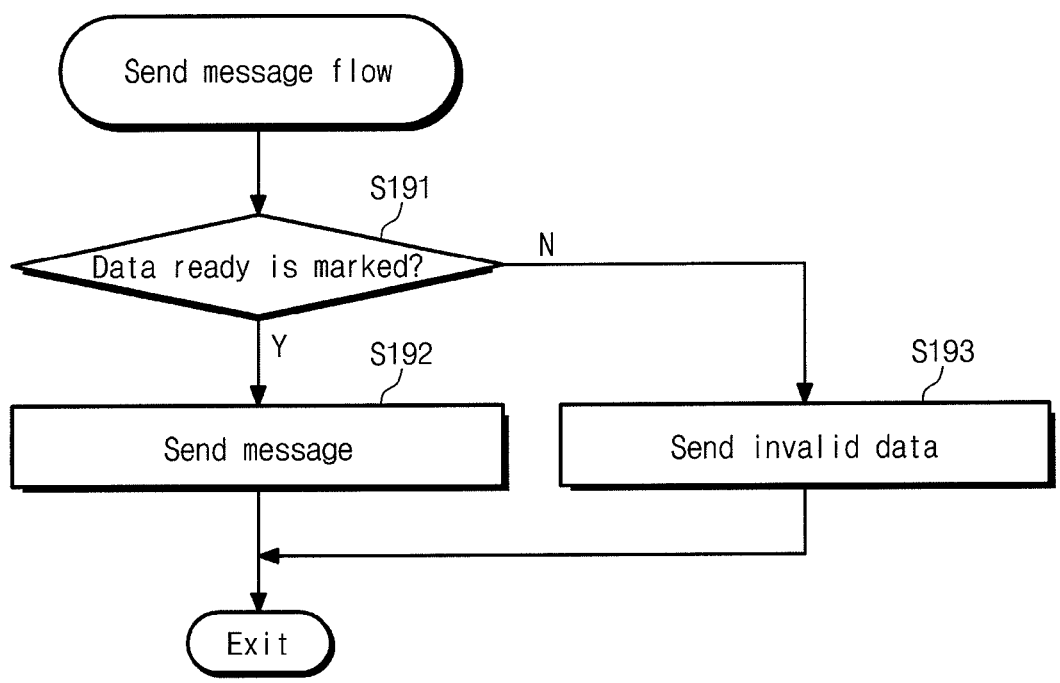
FIG. 7 is a flow chart for describing a message sending process illustrated in FIG. 5 according to an exemplary embodiment of the inventive concept.
Figure 8:
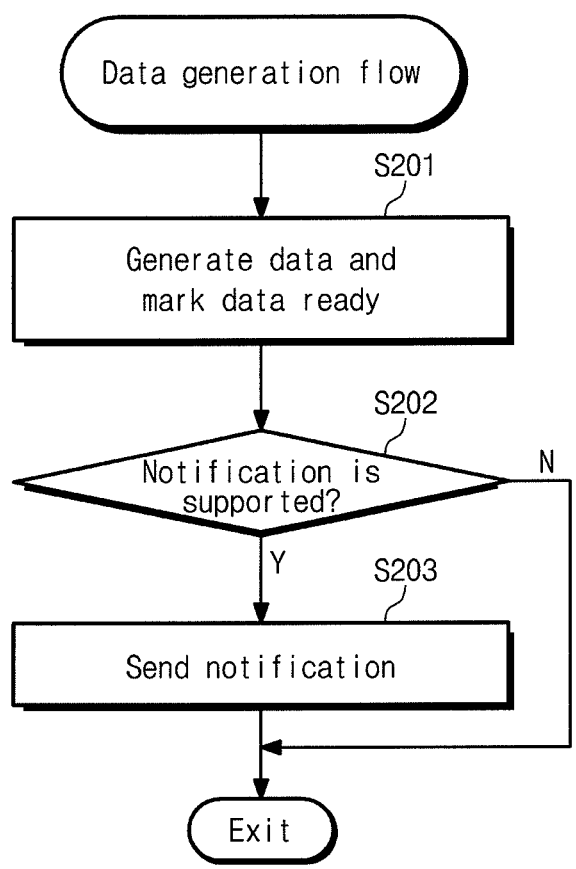
FIG. 8 is a flow chart for describing a process of sending a message to a host when a notification function is defined between a host and a storage device according to an exemplary embodiment of the inventive concept.

FIG. 5 is a flow chart for describing an identification operation and a bidirectional message sending operation of a system including a storage device according to an exemplary embodiment of the inventive concept. FIG. 6 is a flow chart for describing a message information structure reading/writing process illustrated in FIG. 5. FIG. 7 is a flow chart for describing a message sending process illustrated in FIG. 5. FIG. 8 is a flow chart for describing a process of sending a message to a host when a notification function is defined between a host and a storage device. Below, an identification operation and a bidirectional message sending operation of a system including a storage device according to an exemplary embodiment of the inventive concept will be more fully described with reference to accompanying drawings.

For the following discussion, it is assumed that a host 100 and a device storage 200 support at least one embodiment of the above-described notification function. When the storage device 200 is electrically connected with the host 100, the host 100 may determine whether the storage device 200 is a device capable of performing bidirectional communication and form a bidirectional communication layer according to the determined result. The host 100 may be an external device. If the storage device 200 is not capable of performing bidirectional communication, the host 100 may communicate with the storage device 200 according to a unidirectional communication protocol. The firmware FW and messaging information structure IS stored in a storage media 250 may be loaded on a RAM 240 of the storage device 200, which may be powered up through interconnection with the host 100. The loaded firmware FW may be operated by a processing element 230. Afterwards, the storage device 200 may operate responsive to a command provided from the host 100. Operations executed at the storage device 200 may be performed by the firmware (for example, formed of a main program and sub programs) operated by the processing element 230.

Referring to FIG. 5, in step S110, a determination is made as to whether a command is received from the host 100. If the command is not received, the procedure goes to a start step of the main loop. If the command is received, the procedure goes to step S120, in which a determination of whether the received command is an information structure read/write command is performed. As described above, the information structure read/write command may be implemented using a reserved command (or, a reserved feature of a command) or a reserved LBA. If the received command is determined to be the information structure read/write command, the procedure goes to step S130. In step S130, the messaging information structure IS may be sent to the host 100, or setting values of the messaging information structure IS loaded on the RAM 240 may be reconfigured according to a request of the host 100. This will be more fully described with reference to FIG. 6.

As illustrated in FIG. 6, in step S131, a determination as to whether the received information structure read/write command is a read command or a write command is performed. If the received information structure read/write command is a read command, the messaging information structure IS loaded on the RAM 240 may be sent to the host 100. The messaging information structure IS may include the number of buffers forming a ring buffer, a size of each buffer, LBA/tag values being used as an address of each buffer, head and tail pointers of the ring buffer, a message send/receive command, etc. Since the host 100 is provided with the messaging information structure IS, it may recognize the storage device 200 as a device capable of performing bidirectional communication. For example, a bidirectional communication layer may be established between the host 100 and the storage device 200 according to setting values of the messaging information structure IS. Afterwards, the procedure returns to the main loop. After the bidirectional communication layer is established, the setting values of the messaging information structure IS can be reconfigured according to a request of the host 100. Reconfiguring of the messaging information structure IS may be performed in step S133. For example, if the information structure read/write command is determined to be a write command, the procedure goes to step S133, which may be performed according to a request of the host 100 after the bidirectional communication layer is established. For example, when an information structure write command is received from the host 100 after establishing the bidirectional communication layer, the setting values of the messaging information structure IS may be reconfigured. Afterwards, the procedure goes to a start step of the main loop.

Returning to step S120 in FIG. 5, if the received command is determined not to be the information structure read/write command, the procedure goes to step S140, in which a determination as to whether the received command is a message send/receive command is performed. If the received command is determined not to be the message send/receive command, the procedure goes to step S150. In step S150, general operations may be executed (for example, user data read/write operations, error processing operations, power managing operations, etc.) via a unidirectional communication protocol.

In an exemplary embodiment of the inventive concept, the message send/receive command may be implemented using a reserved LBA. For example, as described above, LBA values in the remaining LBA space, obtained by subtracting a user LBA space from an expressible LBA space may be used as message send and receive commands. The message send/receive command may also be stored in the messaging information structure IS. However, embodiments of the inventive concept are not limited to the message send/receive command being implemented using the reserved LBA. For example, the message send/receive command may be implemented using a reserved command (or, a reserved feature of a command).

Referring back to FIG. 6, if the received command is determined in step S140 to be the message send/receive command, the procedure goes to step S160, in which the received command is a message receive command. If the received command is determined to be a message receive command, the procedure goes to step S170, in which a message provided from the host 100 may be stored in appointed buffer(s) of a ring buffer. For example, the application of the host 100 may send data indicating a function being executed by the application agent or the proxy and an address (for example, an LBA value) of a buffer in which the data is being stored, to the storage device 200. The sent data may be stored in the buffer(s) appointed by the application of the host 100. The ring buffer may be stored in a part of the RAM 240. The part of the RAM 240 may be formed of write buffers and read buffers. Each buffer may be appointed using a reserved LBA/tag value as its address.

If the received command is determined not to be a message receive command, the procedure goes to step S180, in which a determination as to whether the received message send/receive command is a read command is performed. If the received message send/receive command is determined to be the read command, the procedure goes to step S190. In step S190, a message stored in a ring buffer may be sent to the host 100, which will be more fully described with reference to FIG. 7.

Referring to FIG. 7, in step S191, a determination as to whether a message being sent is prepared (or, the data ready is marked) is performed. If so, the procedure goes to step S192, in which a message being ready may be sent to the host 100. For example, such a message may include data generated when a function defined by the application is executed. Alternatively, such a message may include a response to a request of the application, information needed to receive data from the application, etc. If the data ready is not marked (or, if a message being sent is not ready), the procedure goes to step S193, in which invalid data or an indication of invalid data is sent to the host 100. Afterwards, the procedure goes to the main loop in FIG. 5. Returning to step S180, if the received message send/receive command is determined not to be a read command, in step S200, an error processing flow may be executed. Afterwards, the procedure goes to the main loop.

A message transfer to the host 100 may be performed via the above-described process S190. The message transfer may use a polling method. When a notification function is defined between the host 100 and the storage device 200, the message transfer to the host 100 may be made using the notification function. When the notification function is used with polling, the time needed to send a message may be reduced.

Referring to FIG. 8, in step S201, data is generated, and data to be sent is marked ready. The data to be sent, may include data generated when a function defined by the application is executed, or information such as a response to a request of the application, information needed to receive data from the application, etc. In step S202, a determination as to whether a notification function is supported is performed. If the notification function is not supported, the procedure goes to the main loop. If the notification function is supported, the procedure goes to step S203, in which the notification is sent to the host 100. Afterwards, the procedure goes to the main loop. The host 100 may send a command (for example, a message send command) for fetching prepared data in response to the notification, to the storage device 200. A message transfer to the host 100 according to an input of a message send command may be identical to that described in step S190.

According to an exemplary embodiment of the inventive concept, the host 100 may identify whether the storage device 200 including the messaging information structure IS is a device capable of performing bidirectional communication. Afterwards, the bidirectional communication channel/layer may be formed according to the identified result. As the bidirectional communication channel/layer is formed, a message transfer may be performed using a protocol defined between the host 100 and the storage device 200.

Figure 9:
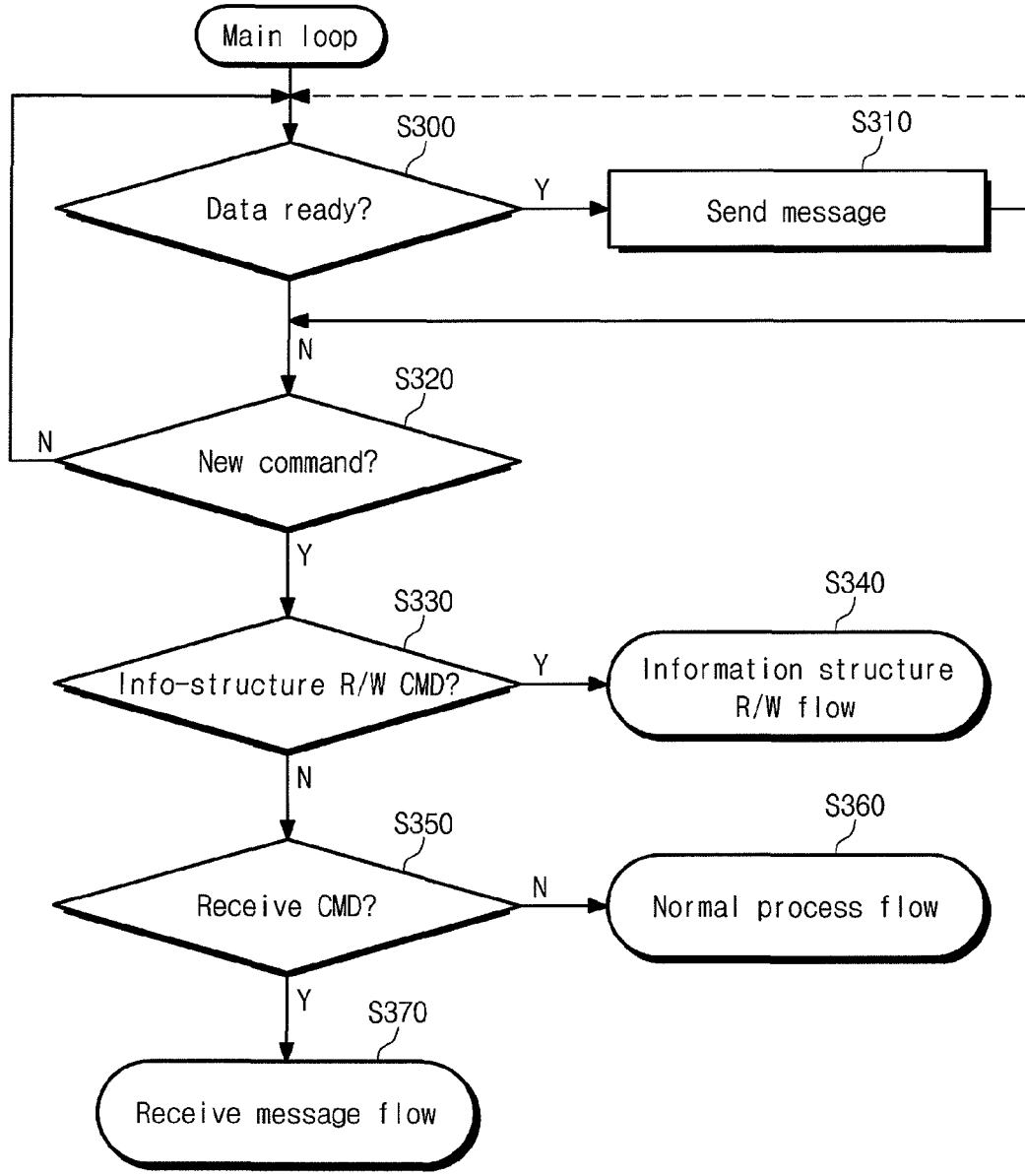
FIG. 9 is a flow chart for describing an identification operation and a bidirectional message sending operation of a system including a storage device according to an exemplary embodiment of the inventive concept.

FIG. 9 is a flow chart for describing an identification operation and a bidirectional message sending operation of a system including a storage device according to an exemplary embodiment of the inventive concept.

Note that no notification is used when the NCQ function is supported. In accordance with the NCQ function, a host 100 may send a set of commands to a storage device 200, and the storage device 200 may perform received commands according to any sequence, respectively. When a system uses the NCQ function, the host 100 may send a read command for a read buffer of the storage device 200 in advance, and the storage device 200 may send data (e.g., a message) to the host 100 at a desired point in time if data being sent is generated.

Referring to FIG. 9, in step S300, a determination is made as to whether data to be sent to the host 100 is prepared (e.g., ready). If data to be sent to the host 100 is not prepared, the procedure goes to step S320. If data to be sent to the host 100 is prepared, the procedure goes to step S310, in which prepared data is sent to the host 100. The data to be sent may be data which is generated after the bidirectional communication layer is formed. After a message transfer to the host 100, the procedure may go to the main loop or step S320 based on a priority.

If data to be sent is not prepared, the procedure goes to step S320, in which a determination is made as to whether a command is received from the host 100. If the command is not received, the procedure goes to a start step of the main loop. If the command is received, the procedure goes to step S330, in which a determination is made as to whether the received command is an information structure read/write command. If the received command is determined to be the information structure read/write command, the procedure goes to step S340. In step S340, the messaging information structure IS may be sent to the host 100, or setting values of the messaging information structure IS loaded on the RAM 240 may be reconfigured according to a request of the host 100, as discussed above with respect to FIG. 6.

Returning to step S330 of FIG. 9, if the received command is determined not to be the information structure read/write command, the procedure goes to step S350, in which a determination as to whether the received command is a message receive command is performed. If the received command is determined not to be the message receive command, the procedure goes to step S360. In step S360, general operations may be executed (for example, user data read/write operations, error processing operations, power managing operations, etc.) via a unidirectional communication protocol.

If the received command is determined in step S350 to be the message receive command, the procedure goes to step S370, in which a message provided from the host 100 may be stored in appointed buffer(s) of a ring buffer. For example, the application of the host 100 may send data indicating a function being executed by the application agent or proxy and an address (for example, an LBA value) of a buffer in which the data is being stored, to the storage device 200. The sent data may be stored in the buffer(s) appointed by the application of the host 100 and processed according to a given sequence.

After the received message is processed, a result may be stored in a read buffer of the ring buffer, and the data ready is marked (or, data prepared to be sent is marked). Afterwards, the procedure goes to the main loop. Since the data ready is marked (or, data prepared to be sent is marked), the result in the read buffer of the ring buffer may be sent to the host.

Figure 10:
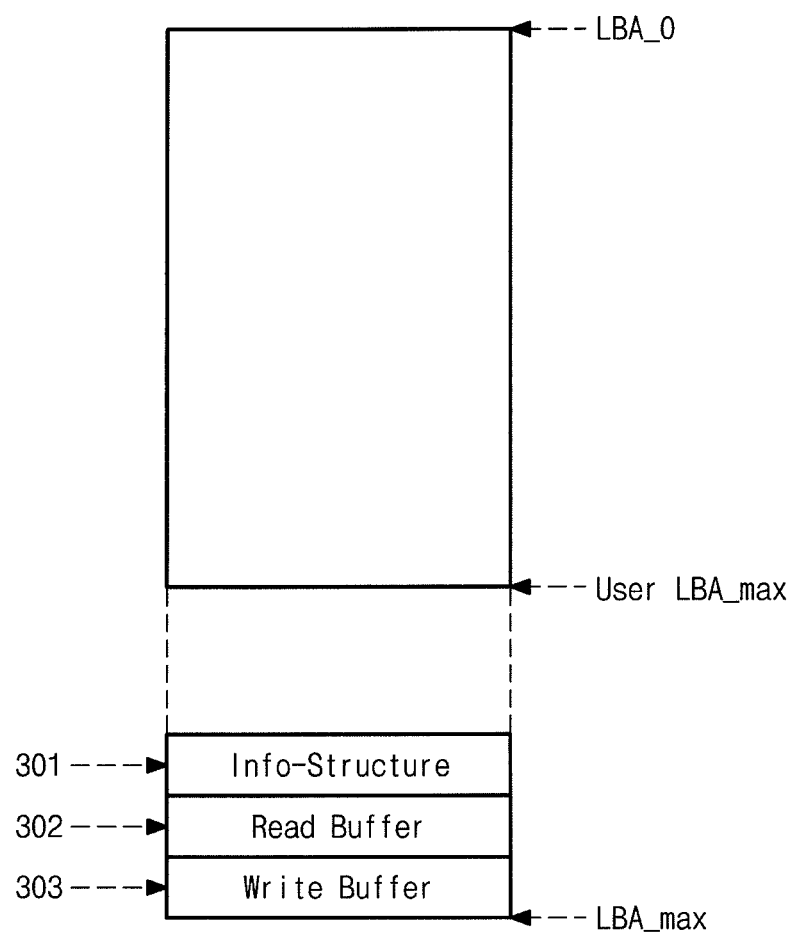
FIG. 10 is a diagram for describing for describing management of a storage device using a reserved LBA according to an exemplary embodiment of the inventive concept.

FIG. 10 is a diagram for describing management of a storage device using a reserved LBA command according to an exemplary embodiment of the inventive concept.

A host 100 may manage a storage space of a storage media 250 according to a Logical Block Address (LBA). A section (e.g. a user space or user data space) in which user data is stored is defined between a minimum value of a user LBA (e.g., LBA_0) and maximum value of a user LBA (e.g., User LBA_max), and the remaining space is not used. In an embodiment of the inventive concept, LBA values in a space between the maximum value of an expressible LBA LBA_max and the maximum value of a user LBA User LBA_max may be used as information structure read/write commands 301, addresses 302 for read buffers, and addresses 303 for write buffers.

Note that the above described methods may be stored on a computer readable medium (e.g., a floppy disk, CD, smart card, flash memory, etc.) and steps thereof may be executed by a processor.

While exemplary embodiments of the inventive concept have been described, it is to be understood that the present invention is not limited to these exemplary embodiments, and various changes and modifications can be made within the spirit and scope of the disclosure.

What is claimed is:

1. A storage device comprising:
   a storage media storing an information structure for establishing a bidirectional communication layer; and
   a controller configured to send the information structure to an external device according to an information structure read/write command, wherein a layer for a bidirectional communication with the external device is established according to the information structure, wherein the controller includes a ring buffer for a message transfer executed via the bidirectional communication layer, wherein the information structure includes the number of buffers of the ring buffer, a size of each buffer, a logical block address LBA value assigned to each of the buffers in the ring buffer, head and tail pointers of the ring buffer, and a message send/receive command.

2. The storage device of claim 1, wherein when the message send/receive command provided from the external device is a receive command, the controller stores a message in a buffer of the ring buffer corresponding to a buffer address included in the receive command.

3. The storage device of claim 2, wherein the message stored in the ring buffer includes a command for an application proxy performing a function of an application of the external device, and the application proxy is installed on the storage device after or before the bidirectional communication layer is formed.

4. The storage device of claim 3, wherein data generated when the command for the application proxy is executed is stored in the ring buffer, and the data stored in the ring buffer is sent to the external device when the message send/receive command provided from the external device is a send command.

5. The storage device of claim 4, wherein after data generated when a command for the application proxy is executed is stored in the ring buffer, the controller marks that data to be sent as ready.

6. The storage device of claim 5, wherein prior to sending information stored in the ring buffer to the external device, the controller determines whether data to be sent to the external device is ready, based on the marking.

7. The storage device of claim 3, wherein the controller stores a command of the application proxy requesting information from the external device or a response to a command for the application proxy, as a message to be sent to the external device, in the ring buffer.

8. The storage device of claim 1, wherein information stored in the ring buffer as a message to be sent to the external device is sent to the external device when a message send/receive command provided from the external device is a send command.

9. A method of forming a bidirectional communication layer between a storage device, including a storage media and a random access memory RAM, and an external device, the method comprising:

loading an information structure for establishing the bidirectional communication layer in the storage media or the RAM when the storage device is electrically connected with the external device; and transferring the information structure to the external device in response to an information structure read/write command from the external device, wherein a layer for a bidirectional communication with the external device is determined according to the information structure, wherein a part of the RAM is used as a ring buffer for a message transfer performed through the bidirectional communication layer, and wherein the information structure includes the number of buffers of the ring buffer, a size of each buffer, an LBA value assigned to each of the buffers in the ring buffer, head and tail pointers of the ring buffer, and a message send/receive command.

10. The method of claim 9, wherein the information structure read/write command is defined using a reserved command.

11. The method of claim 9, wherein the information structure read/write command is defined using logical block address LBA values between an expressible maximum LBA value and a maximum LBA value of a user space.

12. The method of claim 9, wherein the storage device is directly connected with the external device via Small Computer System Interface or an Advanced Technology Attachment ATA/SCSI interface protocol.

13. A method of forming a bidirectional communication channel between a storage device and external device, the method comprising:

sending a command from the external device to the storage device that is configured to access data of an information structure that includes data used to establish a bidirectional communication channel;

transferring the information structure from the storage device to the external device in response to the command; and establishing, by the external device, the bidirectional communication channel using the transferred information structure, wherein the storage device includes a ring buffer for a message transfer performed through the bidirectional communication layer, and wherein the information structure includes the number of buffers of the ring buffer, a size of each buffer, an LBA value assigned to each of the buffers in the ring buffer, head and tail pointers of the ring buffer, and a message send/receive command.

14. The method of claim 13, wherein the command is one of a write command that writes data to the structure or read command that reads data from the structure.

15. The method of claim 13, further comprising sending a message stored in the ring buffer of the storage device to the external device to notify the external device of a state change in the storage device.

16. The method of claim 13, further comprises copying the structure from a storage media to a RAM of the storage device upon a power-on of the storage device.

17. The method of claim 13, further comprising:

sending data from the external device to the storage that indicates a function executed by an application agent or proxy and an address of a buffer; and storing the data in a buffer of the ring buffer on the storage device that corresponds to the address.

* * * * *